(12) United States Patent
Hobmeyr

(10) Patent No.: US 8,506,266 B2
(45) Date of Patent: Aug. 13, 2013

(54) SEALING SYSTEM ASSEMBLY FOR HIGH PRESSURE FLUID HANDLING DEVICES

(75) Inventor: Ralph Hobmeyr, Mainz-Kastel (DE)

(73) Assignee: GM Global Technology Operations LLC, Detroit, MI (US)

( * ) Notice: Subject to any disclaimer, the term of this patent is extended or adjusted under 35 U.S.C. 154(b) by 176 days.

(21) Appl. No.: 12/986,550

(22) Filed: Jan. 7, 2011

(65) Prior Publication Data

US 2011/0100473 A1  May 5, 2011

Related U.S. Application Data

(62) Division of application No. 10/926,632, filed on Aug. 26, 2004, now Pat. No. 7,905,493.

(51) Int. Cl.
 *F04D 29/08* (2006.01)
 *F16J 15/34* (2006.01)

(52) U.S. Cl.
 USPC .................. 417/423.11; 277/369; 277/361

(58) Field of Classification Search
 USPC ............... 417/405, 423.11; 277/361, 362, 277/369, 400; 415/104; 137/2
 See application file for complete search history.

(56) References Cited

U.S. PATENT DOCUMENTS

| | | | |
|---|---|---|---|
| 3,079,605 A | 2/1963 | Thomas | |
| 3,508,758 A * | 4/1970 | Strub | 277/432 |
| 3,532,444 A * | 10/1970 | Strub | 417/423.11 |
| 3,797,963 A * | 3/1974 | Endo et al. | 415/175 |
| 3,880,434 A * | 4/1975 | Echard et al. | 277/348 |
| 4,924,817 A | 5/1990 | Seelen | |
| 5,143,384 A | 9/1992 | Lipschitz | |
| 5,217,233 A | 6/1993 | Pecht et al. | |
| 5,490,679 A | 2/1996 | Borrino et al. | |
| 5,556,111 A | 9/1996 | Sedy | |
| 5,855,469 A | 1/1999 | McConnell | |
| 6,109,617 A * | 8/2000 | Laney | 277/369 |
| 6,182,971 B1 * | 2/2001 | Parker et al. | 277/348 |
| 6,224,060 B1 | 5/2001 | Parker et al. | |
| 6,338,912 B1 * | 1/2002 | Ban et al. | 429/417 |
| 6,345,954 B1 * | 2/2002 | Al-Himyary et al. | 415/112 |
| 6,425,583 B1 | 7/2002 | Muraki | |
| 6,425,746 B1 * | 7/2002 | Mori et al. | 418/55.2 |
| 6,454,268 B1 | 9/2002 | Muraki | |
| 6,497,226 B2 | 12/2002 | Bircann et al. | |
| 6,582,185 B2 * | 6/2003 | Lippert et al. | 415/58.4 |
| 6,655,693 B2 | 12/2003 | Hosanna et al. | |
| 7,021,907 B2 * | 4/2006 | Hobmeyr et al. | 417/368 |
| 7,217,469 B2 * | 5/2007 | Hobmeyr et al. | 429/443 |
| 7,905,493 B2 * | 3/2011 | Hobmeyr | 277/369 |

(Continued)

FOREIGN PATENT DOCUMENTS

WO  99/28985 A1  6/1999

OTHER PUBLICATIONS

Drawing of prior art blower design.

*Primary Examiner* — Devon Kramer
*Assistant Examiner* — Nathan Zollinger
(74) *Attorney, Agent, or Firm* — Quinn Law Group, PLLC

(57) ABSTRACT

A process fluid handling device in an electrochemical cell system having a sealing system assembly between a process fluid compartment and a drive compartment of the fluid handling device. The sealing system includes a double seal configuration forming an interconnection compartment which is supplied with barrier fluid. The sealing system provides isolation of pressurized process fluids from the drive compartment.

16 Claims, 7 Drawing Sheets

(56) References Cited

U.S. PATENT DOCUMENTS

2004/0197205 A1* 10/2004 Hobmeyr et al. ............. 417/313
2004/0241020 A1* 12/2004 Hobmeyr et al. ........ 417/423.11
2005/0100462 A1* 5/2005 Hobmeyr et al. ........ 417/423.12

\* cited by examiner

SEALING SYSTEM ASSEMBLY FOR HIGH PRESSURE FLUID HANDLING DEVICES

CROSS-REFERENCE TO RELATED APPLICATIONS

This application is a divisional of U.S. patent application Ser. No. 10/926,632 filed on Aug. 26, 2004. The entire disclosure of the above application is incorporated herein by reference.

FIELD OF THE INVENTION

The present invention relates to fluid handling devices in an electrochemical cell system, and more particularly to a fluid barrier for fluid handling devices having high pressure process fluid streams in an electrochemical cell.

BACKGROUND OF THE INVENTION

Electrochemical fuel cells can be used in a vast array of applications as a power source, including as an alternate power source to the internal combustion engine for vehicular applications. An electrochemical fuel cell contains a membrane sandwiched between electrodes. One preferred fuel cell is known as a proton exchange membrane (PEM), where hydrogen ($H_2$) is used as a fuel source or reducing agent at an anode electrode and oxygen ($O_2$) is provided as the oxidizing agent at a cathode electrode, either in pure gaseous form or combined with nitrogen and other inert diluents present in air. During operation of the fuel cell, electricity is garnered by electrically conductive elements proximate to the electrodes via the electrical potential generated during the reduction-oxidation reaction occurring within the fuel cell.

Fluid handling devices within the fuel cell system circulate the process fluids (e.g. reactant gases, coolant, effluent streams) throughout the system. Fluid handling devices that deliver hydrogen-containing gases to and from the anode pose particular design challenges due to the reactivity of hydrogen and hydrogen-containing gases. The fluid handling device should sufficiently isolate the hydrogen-containing process fluids, so that the hydrogen-containing gases are not released into the surrounding environment. Additionally, preventing leakage in fluid handling devices processing high pressure fluids is desirable, especially where the fluid handling device has variable speed, because such leakage increases the inefficiency of the fluid handling devices. Fluid handling devices, such as pumps, blowers, and compressors, typically have rotating shafts that extend through the housing of a motor compartment to a process fluid compartment. Mechanical seals surrounding the shaft and separating the motor and process fluid compartments may fully seal process fluids from the environment, however, typically the mechanical seals have high friction which may shorten the seal lifespan. Other fluid handling device configurations may isolate the device from the surrounding environment by encasing it in a sealed (e.g., hermetically) protective housing. There is a need for improving the fluid barriers of fluid handling devices that handle pressurized fuel cell system process fluids, which potentially are reactive, corrosive, and/or combustible.

SUMMARY OF THE INVENTION

A sealing assembly is provided for a fluid handling device comprising a rotatable shaft having a drive end opposite to a propulsion end. A first seal is concentrically disposed on the shaft between the drive end and the propulsion end. The first seal contacts the process fluid. A second seal is also concentrically disposed on the shaft between the first seal and the drive end. A ring is fixed to the rotatable shaft and disposed on the shaft between and adjacent to the respective first and second seals, where the ring is on a side of the first seal opposite to a side contacting the process fluids. An interconnection compartment is thus formed between the first and the second seals and contains the ring and barrier fluid. The interconnection compartment having the barrier fluid prevents migration of pressurized process fluids across the first seal.

In another aspect, the present invention provides a fluid handling device for a process fluid comprising a process fluid compartment in contact with process fluids having a first pressure, and a drive compartment having a second pressure and having a drive unit for moving the process fluids in said process fluid compartment, wherein said first pressure is greater than said second pressure, and a sealing assembly is disposed between the process fluid compartment and the drive compartment, comprising a ring, a first seal, and a second seal. The first seal and the second seal form an interconnection compartment through which the drive unit extends, and the interconnection compartment substantially prevents migration of the process fluids to the drive compartment.

In another aspect, the present invention provide a method of operating a fluid handling device in a fuel cell, the method comprising forming an interconnection compartment between a first seal bounded by a process fluid compartment and a second seal bounded by a drive compartment. An interconnection compartment contains a shaft that extends from the process fluid compartment containing process fluids to the drive compartment. The interconnection compartment further houses a ring for sealing that rotates with the shaft. The method comprises supplying a barrier fluid to the interconnection compartment, wherein the barrier fluid has a pressure greater than or equal to the process fluid compartment, thereby preventing migration of process fluids through the first seal to the interconnection compartment.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

The present invention contemplates a sealing assembly in a fluid handling device in a fuel cell system to separate process fluids in a stage compartment from a drive compartment in fluid communication with ambient. The sealing system forms a fluid barrier in part by forming an interconnection compartment separating the stage and drive compartments. The interconnection compartment of the sealing assembly is formed by a pair of seals. In certain embodiments, it is preferred that the interconnection compartment is filled with a pressurized barrier fluid (e.g., barrier gas) to establish a pressure greater than or equal to the neighboring stage compartment to prevent process fluids from migrating between the stage and drive compartments. The present invention may be employed in fluid handling devices that circulate both liquid and gas phase process fluids, and is particularly useful in applications having highly pressurized process gases. First, to better understand the present invention, a brief description of an exemplary electrochemical fuel cell system, wherein the present invention is useful, is helpful for understanding various aspects of the present invention.

Figure 1:
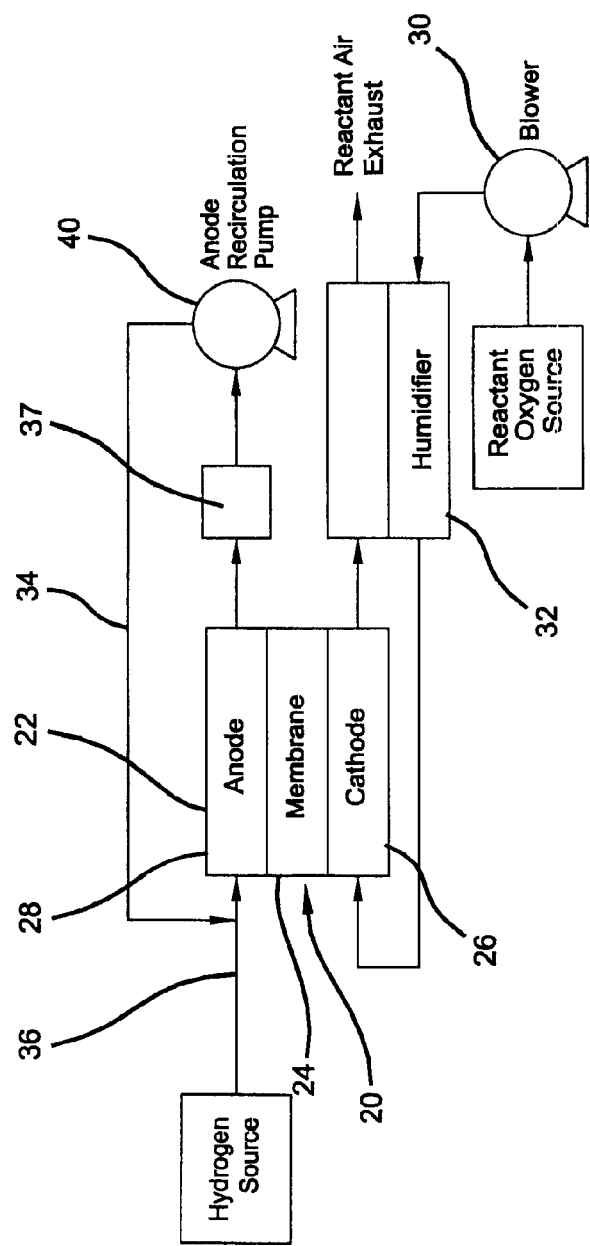
FIG. 1 is a schematic representation of an exemplary fuel cell system having an anode recirculation.

As shown in FIG. 1, an individual fuel cell 20 is shown in a stack 22. The stack 22 may optionally comprise a plurality of connected fuel cells, as is well known in the art, however, for simplicity is shown here with only a single fuel cell. The fuel cell 20 comprises a polymer electrolyte membrane 24 that is sandwiched between two electrodes: a cathode 26 and an anode 28. Reactant gases are introduced at both the anode 28 and the cathode 26, in a preferred embodiment, the reactant gas introduced at the anode 28 is hydrogen-containing (a reductant), and the reactant gas introduced at the cathode is oxygen-containing (an oxidant).

The cathode and anode electrodes 26, 28 typically contain catalysts to facilitate the electrochemical reaction between the oxygen and hydrogen. A preferred polymer electrolyte membrane is a proton exchange membrane (PEM) 24, which permits transport of protons from the anode 28 to the cathode 26, while an external circuit transfers electrons released at the anode 28 to generate an electrochemical potential. PEMs 24 require humidification, which is generally provided by a humidifier 32 that supplies moisture to reactant gas streams entering the stack 22. Fluid handling devices, which include, by way of example, pumps, compressors, and blowers, circulate reactant gases and fluid streams to and from the stack 22. For example, a cathode blower/compressor 30 delivers oxygen-containing gas to the cathode 26.

Electrochemical reactions within the fuel cell 20 generate product water on the cathode 26 side. At the anode 28, hydrogen gas is consumed in proportion to the reactions occurring within the fuel cell 20. During typical operations, there are few or no reaction byproducts generated at the anode 28. Many different configurations for fluid handling at the anode 28 are possible, including discontinuous delivery such as "dead-ending" of the anode reactant into the stack 22. The configuration depicted in FIG. 1, includes a continuous operating loop 34, where the anode effluent stream is recirculated or recycled back into the anode inlet 36 of the stack 22 by an anode recirculation fluid handling device, or pump 40. The recycled anode stream 34 optionally passes through a recirculation loop filter 37 to remove any impurities or to prevent potential poisoning of the fuel cell 20. Anode gases typically contain moisture while circulating through the fuel cell 20 and generally remain humidified upon exiting the stack 22. Further, anode 28 effluent generally accumulates nitrogen or other diluents by diffusion across the PEM 24 or via gas leakage in the system.

Handling of hydrogen-containing process gases or fluids, such as anode effluent, can pose operational and quality issues due to the high reactivity of hydrogen. The leakage of humidified hydrogen-containing gas into the drive compartment may cause corrosion or chemical attack (e.g. passivation) of the various components of the motor. Particularly, exposure of the magnetic materials in the motor to hydrogen-containing humidified anode gases appears to detrimentally impact inductive performance and significantly shorten the lifespan of the pump motor. Additionally, other fluid handling devices in the system include those with pressurized fluids, such as the cathode compressor or blower 30, where leakage promotes inefficiency. It has been found that traditional single seal designs are not well suited for high pressure differences across the seal and potentially permit significant fluid leakage. The present invention provides a fluid sealing system, ensuring isolation of various pressurized fuel cell process fluids, particularly for high pressure process fluid streams.

Figure 2:
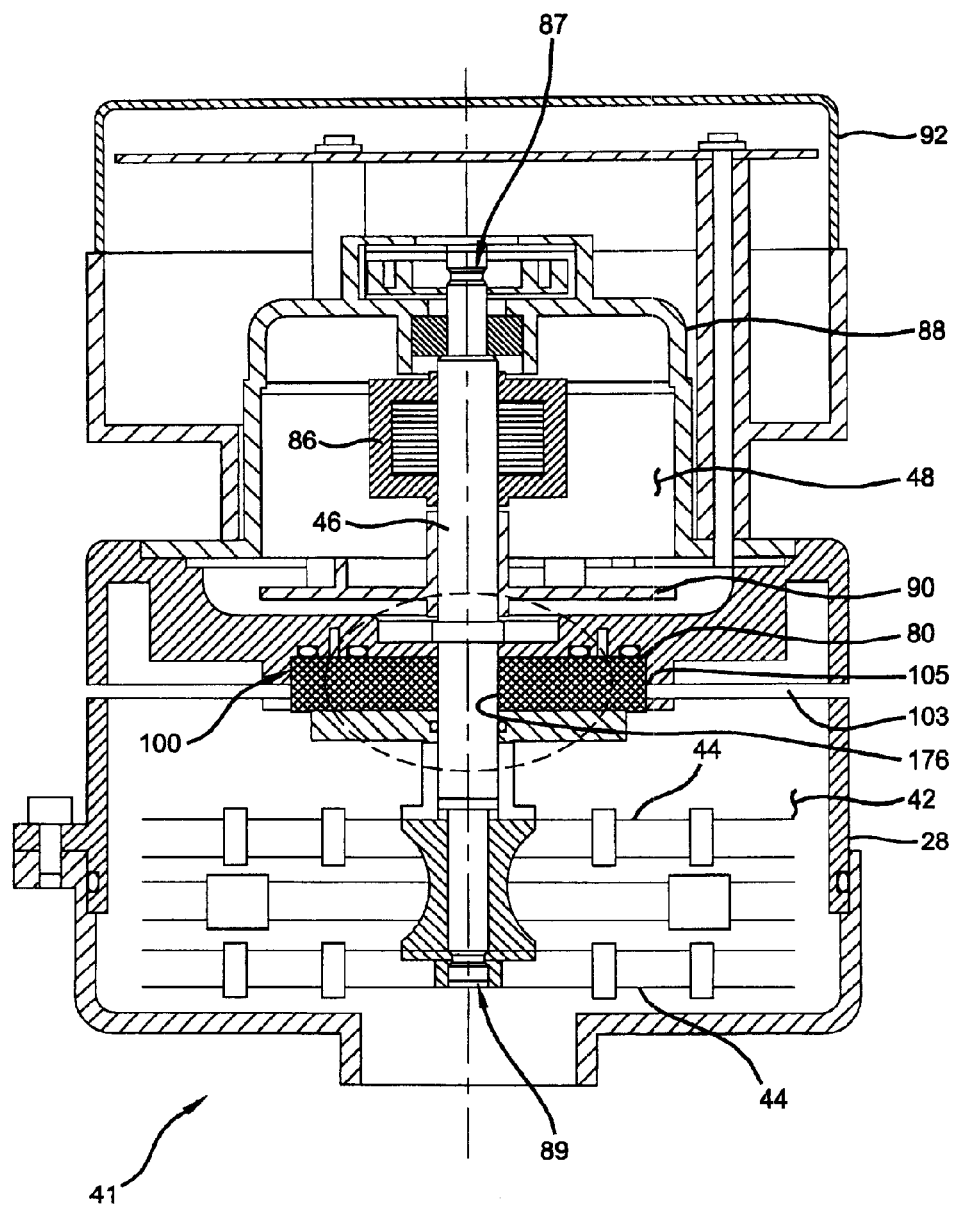
FIG. 2 is a cross-sectional view of an exemplary fluid handling device according to the present invention.

One preferred configuration of a fluid barrier sealing system in a fluid handling device according to the present invention is shown in FIG. 2. An exemplary fluid handling device, a compressor 41, is shown. Although the fluid handling device 41 is shown as a two stage radial compressor, it is appreciated that the present invention is not limited to the design and fluid handling device type shown. The compressor 41 has a process fluid propulsion or stage compartment 42 that contains and transports the process fluids. A propulsion device (e.g. one or more impellers 44) propels process fluid in the stage compartment 42, and connects to a drive unit comprising a rotatable shaft 46 that extends to a motor or drive compartment 48. Process fluid is introduced to the stage compartment 42 at a suction inlet (not shown), is pressurized by the fluid propulsion device 44, and exits at an outlet (not shown). Such process fluid, in the case where the fluid handling device 41 is an anode recirculation pump 40, is typically a pressurized humidified hydrogen-containing gas, but the present invention may apply to any pressurized gases in the system, including those that are combustible, poisonous, reactive, or corrosive, that should be contained solely in the process fluid stage compartment 42 of a fluid handling device 41.

The drive compartment 48 of the compressor 41 houses the drive unit, which includes a motor 86 housed in a motor casing 88. The motor 86 is connected to the shaft 46 to induce rotation. The shaft 46 of the drive unit ultimately translates motion to the impeller 44 to propel fluids in the stage compartment 42. The shaft 46 extends axially from a drive end 87 in the drive compartment 48 into and through the interconnection region or compartment 80 to a fluid propulsion end 89 in the stage compartment 42. Generally, a cooling fan 90 is provided in the drive compartment 48, which draws in ambient air for cooling the motor 86 and its several components. Such a cooling fan 90 may be located in a number of different locations within the drive compartment 48 different from the location depicted in FIG. 2. The drive compartment 48 is in fluid communication with the external environment or ambient. A housing 92 encases the motor 86 and cooling fan 90 components. The drive compartment 48 is separated from the stage compartment 42 by a sealing assembly system 100 disposed concentrically about and circumscribing the shaft 46. The sealing system 100 provides a fluid barrier between the stage compartment 42 and the drive compartment 48.

Figure 3:
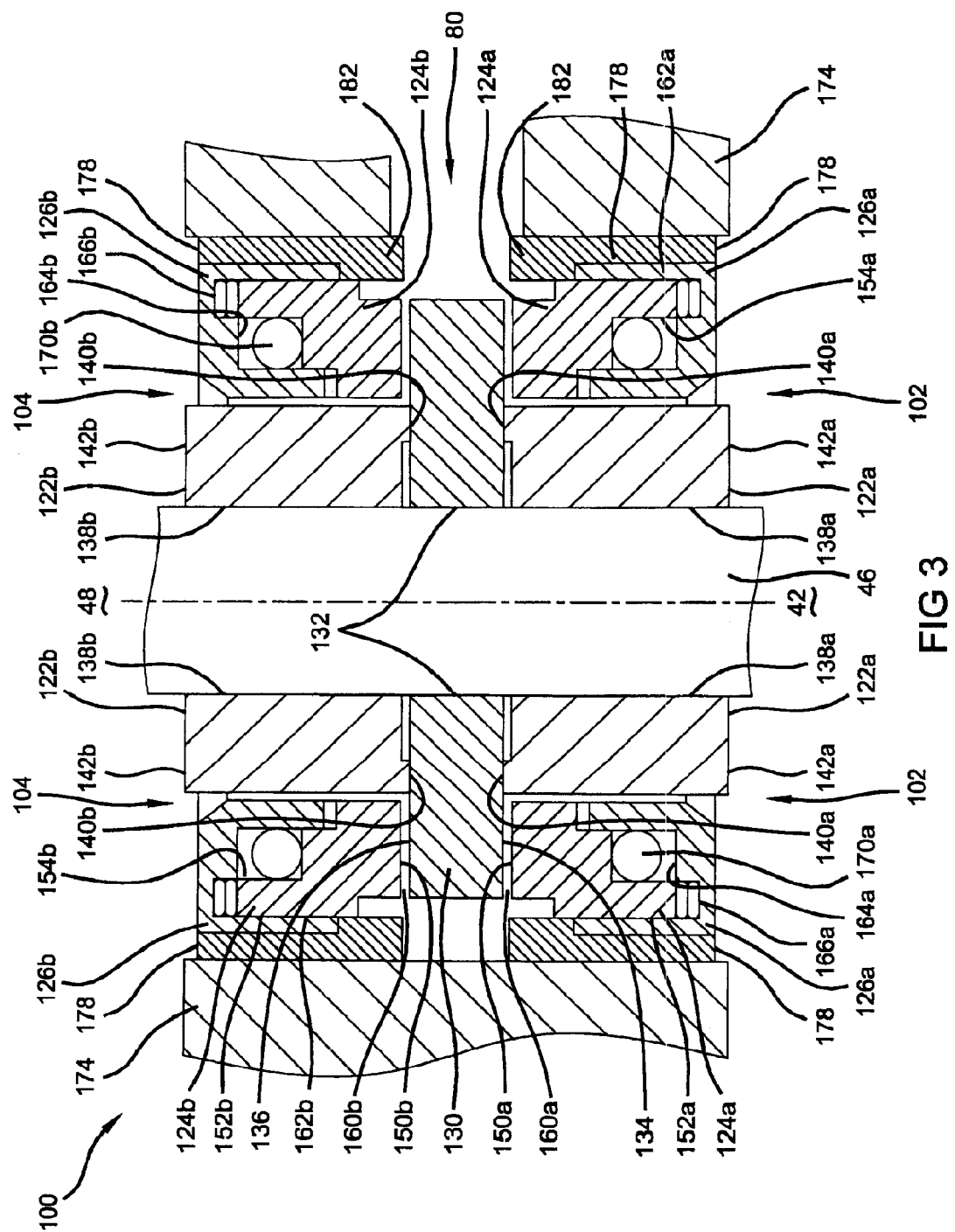
FIG. 3 is a detailed view of a sealing system of the fluid handling device of FIG. 2.

As shown in FIG. 3, the sealing system 100 comprises a first seal 102 and a second seal 104. The first seal 102 confronts the stage compartment 42 and contacts process fluids and the second seal 104 confronts the drive compartment 48 and contacts the ambient. Thus, the first and second seals 102, 104 form an interconnection region or compartment 80 which is substantially isolated from the stage and drive compartments 102, 104. The first and second seals 102,104 have common component assembly configurations, and are herein discussed with a common description having nominal designations of "a" for the first seal 102 and "b" for the second seal 104.

Each seal 102,104 comprises a collar 122a,122b; a slide head 124a,124b; and a shield 126a,126b. A slide ring 130 is disposed along the shaft 46 in the interconnection compartment 80 and includes a central bore 132 and a first and second opposing surface 134, 136. The central bore 132 fixedly receives the main body of the drive shaft 46. The collars 122a,122b likewise include a central bore 138a, 138b. In preferred embodiments of the present invention, the slide ring 130 is fixedly attached to the shaft 46 in the interconnection compartment 80 by collars 122a and 122b, and is adjacent to and sandwiched between respective slide heads 124a,124b of the first and second seals 102,104. The collars 122a, 122b have a first surface 140a,140b; and a second surface 142a, 142b. The first surface 140a of the collar 122a of the first seal 102 contacts the first surface 134 of the slide ring 130. Likewise the first surface 140b of the collar 122b of the second seal 104 contacts the second surface 136 of the slide ring 130. The central bores 138a,138b each receive the drive shaft 46 and each collar, 122a and 122b, is sealed and fixedly attached thereto and thus fixes and seal the slide ring 130 and drive shaft 46 in the interconnection compartment 80. In alternate embodiments, not depicted here, the sealing of the collars 122a, 122b is achieved by seals (e.g., an O-Ring) disposed between the collars 122a, 122b and the slide ring 130. Another alternative is to provide a conventional mechanical seal between the collars 122a, 122b and the slide ring 130 to prevent fluid leakage therebetween.

The slide heads 124a,124b are disposed adjacent to each respective collar 122a,122b and include a reaction surface 150a, 150b; an engagement surface 152a, 152b; and a recess 154a, 154b. The reaction surface 150a is disposed adjacent the first surface 134 of the slide ring 130. During operation and rotation of the shaft 46 and slide ring 130 the reaction surface 150a separates and becomes spaced apart from the first surface 134 of the slide ring 130 to define a gap 160a in which an air stream is generated when shaft 46 rotates, as will be discussed further below. Likewise, reaction surface 150b is spaced from the second surface 136 of the slide ring 130 to define a gap 160b during operation. The slide heads 124a, 124b are non-rotatably supported by brackets 126a, 126b generally between flanges 162a, 162b and reaction surfaces 164a, 164b and are permitted to translate therein.

Each slide head 124a, 124b is supported by a spring 166a, 166b disposed in channels of the brackets 126a, 126b such that the springs 166a, 166b impart a bias on the slide heads 124a, 124b so that the slide heads 124a, 124b are biased toward, the respective first and second surfaces 134, 136 of the slide ring 130. Thus, during non-operational periods, where there is no rotation of the shaft 46, slide ring 130 and collars 122a, 122b, the reaction surfaces 150a, 150b physically contact the first and second surfaces 134, 136 of the slide ring 130. During operation and rotation of the slide ring 130 the volume of flowing fluid separates the slide heads 124a, 124b from the slide ring 130 to form gaps 160a, 160b. Springs 166a, 166b limit the axial movement of the slide heads 124a, 124b due to pressure variations. The bracket 126a, 126b further supports the slide head 124a, 124b through the interaction of O-rings 170a, 170b whereby the O-rings 170a, 170b are disposed between the reaction surface 164a, 164b and the recesses 154a, 154b of the slide heads 124a,124b. In this manner, the slide heads 124a, 124b are permitted to translate axially relative to the brackets 126a, 126b through the bias imparted thereon by the springs 166a, 166b. The O-rings 170a, 170b serve to maintain a seal between the reaction surface 164a, 164b and the slide heads 124a, 124b as the slide heads 124a, 124b translate relative to the brackets 126a, 126b. In this regard, the recess 154a, 154b provides a clearance generally between the brackets 126a, 126b and the slide heads 124a, 124b to provide the slide heads 124a, 124b with the ability to move relative to the bracket 126a, 126b while still maintaining contact with the O-rings 170a, 170b. The brackets 126a, 126b are fixedly supported by the partition wall 174 at a central aperture 176 (FIG. 2) by shields 178 to provide the brackets 126a, 126b with the requisite strength required to support the seals 102, 104 and further to prevent fluids from entering the sealing assembly 100. The shields 178 extend from the flanges 162a, 162b and include a flange 182 which serves to block an area generally between the slide heads 124a, 124b and the slide ring 130. Specifically, as the fluid is caused to flow over the seals 102, 104 the flanges 182 block the flow from entering the interconnection compartment 80 and directs the flow to the gaps 160a, 160b generally between the slide heads 124a, 124b and slide ring 130. In this manner, the fluid enters each seal 102, 104 generally between the slide heads 124a, 124b and the slide ring 130 in a controlled manner, and may be controlled through the interaction of the slide ring 130, the slide heads 124a, 124b, and collars 122a, 122b. Specifically, because of the rotation of slide ring 130 relative to slide heads 124a, 124b, an air stream is created in the gaps 160a, 160b that flows in the direction of the stage compartment 42, thus sealing the stage compartment 42 against loss of process fluids. As will be discussed in greater detail below, the barrier fluids introduced into the interconnection compartment 80 preferably flow in the direction of the stage compartment 42, and optionally into the drive compartment 48, as well.

To regulate the flow of fluid through the seals 102, 104, generally via gaps 160a, 160b, the springs 166a, 166b are adjusted to fit the particular application. Because the slide ring 130 is rotating relative to the slide heads 124a, 124b, precise adjustment of the springs 166a, 166b, such that the slide heads 124a, 124b are maintained in close proximity to the slide ring 130 is required. Maintaining the slide heads 124a, 124b in close proximity to the surfaces 134, 136 of the slide ring 130 is important as this will restrict fluid flow through each respective seal 102, 104 and will thereby improve the overall effectiveness of the seals 102,104.

Adjustment of the spring constant, or type of spring used, will vary depending on the application and desired fluid flow through each respective seal 102, 104. Specifically, where a small amount of fluid flow is desirable, springs 166a, 166b can be utilized to press tightly to the surfaces 134, 136 of the slide ring 130, while to allow for more fluid to pass through the seals 102, 104, the springs 166a, 166b will be relaxed, thereby allowing the distance between the slide heads 124a, 124b and slide ring 130 to be increased.

Figure 4:
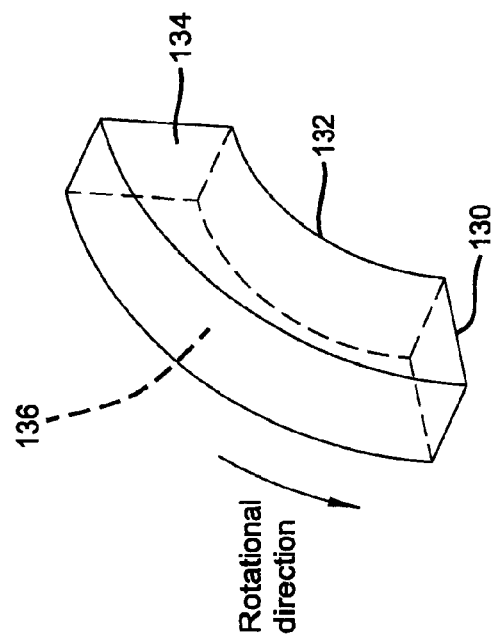
FIG. 4 is a cut away perspective view of an exemplary quarter section of a preferred embodiment of a slide ring useful in accordance with a sealing assembly of the present invention.

FIG. 4 shows one preferred embodiment on the present invention, where a quarter-sectional view of the slide ring 130 is an annular disk having smooth first and second surfaces 134, 136 that rotate within the gaps 160a, 160b (FIG. 3) formed between the first and second seal heads 124a, 124b (FIG. 3). During rotation of the shaft 46 (FIG. 3), the slide ring 130 eliminates substantially all fluid communication in the gaps 160a, 160b. The volume of fluid flowing through the gaps 160a, 160b can be minimized. For example, the volume flow through the gaps 160a, 160b depends on several factors, including by way of example, the rotational speed of the shaft 46, the diameter of the slide ring 130, the temperature of the fluids, and the distance and physical properties of the slide ring 130 and the respective opposing slide head 124a and 124b. It is preferred that the physical distance between each slide ring surfaces 134, 136 and the respective reaction surfaces 150a, 150b of the slide heads 124a, 124b is less than about 10 μm, more preferably less than about 5 μm, more preferably between about 1 to about 3 μm, and even more preferably less than or equal to 1 μm. Non-limiting examples of materials of construction for the slide ring and slide head include metals, such as stainless steel, ceramics, and carbon composites.

Figure 5:
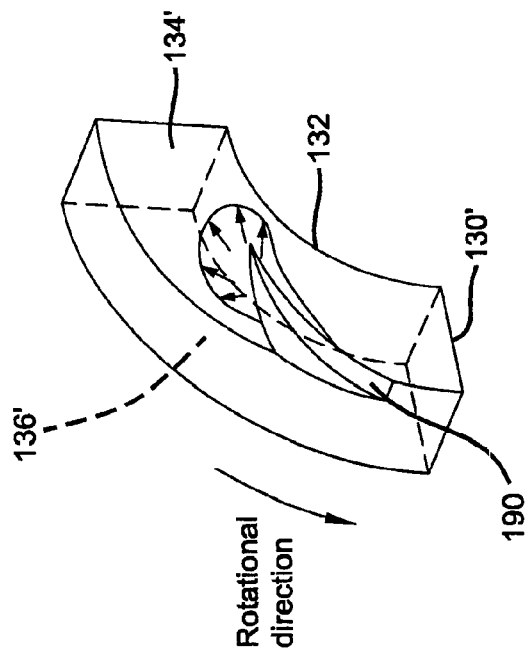
FIG. 5 is a cut away perspective view of another preferred embodiment of an exemplary quarter section of a slide ring useful in accordance with a sealing assembly of the present invention.

In FIG. 5, an alternate preferred embodiment of a quarter of a slide ring 130' is depicted. The slide ring 130' is an annular disk having the central bore 132 through which the shaft 46 (FIG. 3) is received. The slide ring 130' has a first surface 134' and a second surface 136' that are disposed adjacent to the reaction surfaces 150a, 150b of the first and second slide heads 124a, 124b of the first and second seals 102, 104 shown in FIG. 3. Aerodynamic grooves 190 are formed within the first surface 134', the second surface 136', or both. The grooves 190 increase the speed of fluids flowing in the gap (e.g., 160a, 160b) such that the volume of fluid flowing through the gap regions 160a, 160b is reduced. The shape, placement, and number of the grooves 190 is best determined by computational fluid dynamics software (CFD), as appreciated by one of skill in the art. Preferred grooves penetrate about 4 to about 5 μm into the first or second surfaces 134', 136'.

With renewed reference to FIG. 2, in certain embodiments of the present invention, a barrier fluid is introduced into the interconnection compartment 80 at a pressure approximately equal to or greater than the pressure of the process fluids in the stage compartment 42 to provide additional means of isolating the process fluids circulating through the stage compartment 42 from the drive compartment 48 and external environment (in addition to the first and second seals 102,104 disposed at the junction or boundary between the housing of each compartment and the shaft 46). Preferably, the barrier fluid is a gas, which may comprise atomized liquid droplets, and has a pressure greater than or substantially equal to the process fluids. It should be noted that the barrier fluid may have a pressure slightly lower than the process fluid pressure, and during operation, the pressure generated via the sealing configuration of the seals 102, 104 described above, compensates for the slightly lower pressure of the barrier fluid as introduced to the interconnection compartment 80, to provide a fluid barrier having equivalent pressure to the adjacent process fluid, thereby preventing migration of process fluid from the stage compartment 42 to the drive compartment 48 through the interconnection compartment 80. A barrier fluid passage 103 is connected to an inlet 105 of the interconnection compartment 80, where barrier fluid is filled and supplied thereto. It has been found that by introducing a pressurized barrier gas into the interconnection compartment 80, the effectiveness of the sealing assembly 100 is enhanced, particularly where a large pressure drop occurs between the pressure in the stage compartment 42 and the pressure in the drive compartment 48. In alternate embodiments, where the differential pressure between the stage compartment 42 and drive compartment 48 is less than about 0.5 bar, the sealing assembly 100 generates sufficient pressure to prevent fluid migration between the compartments 42, 48. Thus, in preferred embodiments of the present invention, no process fluids, especially hydrogen-containing fluids or high pressure process fluids permitted to leak through the sealing system 100 and allowed to enter the drive compartment 48.

A first pressure within the stage compartment 42 is designated as $P_1$. A second pressure within the drive compartment 48 is designated as $P_2$, and a third pressure within the interconnection compartment 80 is designated as $P_3$. One embodiment of the present invention involves maintaining the interconnection compartment chamber pressure, $P_3$, at a higher level or equal to the pressure of the adjacent stage compartments (i.e. $P_3>P_1$), thus preventing process fluid from migrating from the stage compartment 42 into the interconnection compartment 80 or to the drive compartment 48, or external environment. For example, current pressure values of the process fluids in a stage compartment for an anode recirculation loop pump generally varies from between about 1 to 2.8 bar absolute, generally equal to or above atmospheric ambient pressure. Cathode operating systems may have process fluid pressures of 2 to 3 bar. Thus, it is preferred in accordance with the present embodiment that the interconnection compartment pressure is between about 1 to about 3 bar absolute, corresponding to the fuel cell system operating pressures. However, it is contemplated that such values are dependent upon fuel cell system design, and may vary greatly. The pressure of the anode and cathode inlet loops, or anode recirculation loop in a fuel cell are generally dependent upon the fuel cell system pressure, which is in turn generally a function of the power level output of the fuel cell. Other variables within the fuel cell further limit the operating system pressures, including membrane pressure tolerance levels. The present invention is particularly suitable to pressurized fuel cell streams; such that the barrier fluid and interconnection compartment 80 pressure ($P_3$) meets or exceeds the process fluid pressure in the stage compartment 42 ($P_1$). The higher interconnection compartment 80 pressure $P_3$, enables improvement of the fluid sealing system assembly 100 of the present invention, by matching or exceeding the overall pressure of the fuel cell, as it operates.

Slight quantities of barrier gas potentially migrate across the first seal 102 flowing from the direction of higher pressure to the region of lower pressure, which translates to barrier gas flow into the stage compartment 42 originating from the interconnection compartment 80. Since the fuel cell operating system pressure usually exceeds ambient pressure, a primary consideration is the differential pressure between the interconnection compartment pressure, $P_3$, and the stage compartment pressure $P_1$, to isolate process fluids, rather than with the drive compartment pressure $P_2$. In alternate embodiments, the pressure of the barrier gas in the interconnection compartment 80 exceeds the pressure of both the neighboring stage and drive compartments 42,48. ($P_3>P_1$ and $P_3>P_2$). In embodiments where the interconnection compartment 80 pressure $P_3$ is greater than the drive compartment 48 pressure $P_2$, barrier fluid flows into the drive compartment 48 across the second seal 104. The amount of leakage across the seals 102, 104 is dependent on the mechanical seal component settings (e.g., spring tension), as well as the differential pressures between $P_3$ and $P_1$ or $P_2$, respectively.

According to certain preferred embodiments of the present invention, a slight positive differential pressure is maintained between the interconnection 80 and stage 42 compartments, such that $P_3-P_1=\Delta P_1$, where $\Delta P_1$ is preferably greater than or equal to 0. The barrier fluid buffers and blocks process fluid from entering into the interconnection compartment 80 and further forces barrier gas to flow into the stage compartment 42, when there is fluid communication via fluid migration across the first seal 102. In such a configuration, the differential pressure between the interconnection compartment 80 and the drive compartment 48 is given by $P_3-P_2=\Delta P_2$. As previously discussed in certain embodiments, $\Delta P_2$ is maintained at a value greater than or equal to zero to favor barrier fluid flowing towards the drive compartment 48. In alternate preferred embodiments, $\Delta P_2$ can be a negative value, in that the drive compartment pressure $P_2$ is greater than $P_3$, and thus flows towards the interconnection compartment 80.

Fuel cell operations fluctuate greatly during various operating conditions, such as start-up or variations in power demand. Hence, the pressure of the fuel cell operating system is likewise dynamic and may undergo transient operational periods. System design according to the present invention, optimizes the differential pressure values of the fluid barrier 56 (i.e., $\Delta P_1$ and $\Delta P_2$) to be sufficient when the process fluids are at maximum pressures, accounting for potential pressure spikes in the fuel cell operations.

As previously discussed, seal leakage (i.e. fluid migration across the seal) is a function of differential pressures and increases in conjunction with increased differential pressure. In certain exemplary fuel cell systems, an average differential pressure for $\Delta P_1$ is preferably less than about 1.5 bar, more preferably less than about 0.5 bar, and most preferably between about 0.1 bar to 0.5 bar to maintain the integrity of the fluid barrier. An average value indicates the differential pressure value maintained over a duration of time, by averaging the instantaneous differential pressure values. At such levels, the differential pressure is relatively small, yet sufficiently high for a fluid barrier. As appreciated by one of skill in the art, many variables in a system may impact the required barrier gas pressure, and thus, both $P_3$ and the differential pressures $\Delta P_1$ and $\Delta P_2$ may vary greatly depending on system design.

Barrier gas that leaks into the stage compartment 42 combines with the process fluids, and enters the fuel cell 20 downstream. Selecting the composition of the barrier gas involves evaluating the impact that the barrier gas may have on fuel cell 20 operations. Although the concentration of the quantity of barrier gas flowing into the fuel cell 20 is preferably small or negligible, compatibility with the internal components of the fuel cell 20 is important to avoid poisoning of the electrode catalysts, membrane 24, or other components. Likewise, the barrier gas also enters the drive compartment 48 where it interfaces with the motor 86 components. Although the quantity of barrier gas entering the drive compartment 48 is preferably negligible or small, appropriate compatibility with the drive compartment 48 components and the external environment is also important. Thus, selection of a suitable barrier fluid according to the present invention balances the physical properties of the gas and their impact on the system with relative cost. The present invention contemplates several different fuel cell system configurations for providing a barrier fluid to the interconnection compartment 80.

Figure 6:
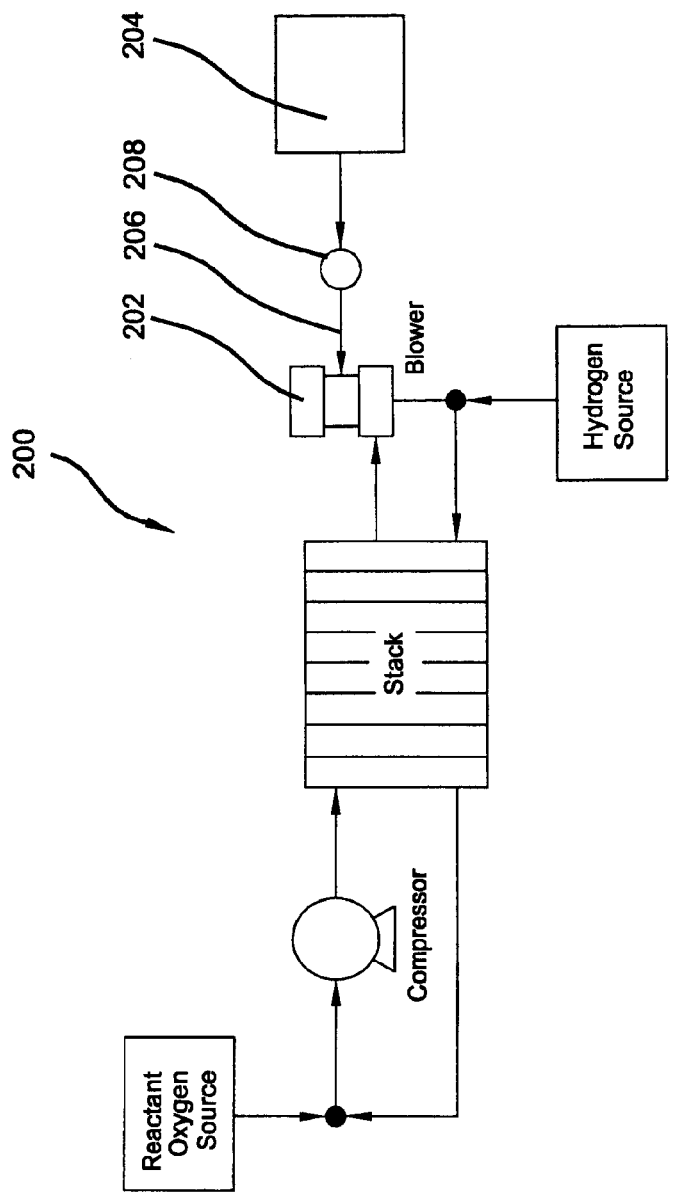
FIG. 6 is a schematic representation of a fuel cell system according to the principles of the present invention where barrier fluid is delivered to a sealing system for a fluid handling device from a storage vessel according to the present invention.

FIG. 6 shows one preferred embodiment of a fuel cell system 200 for delivery of the barrier fluid to a fluid handling device 202. A storage tank 204 contains a pressurized inert gas. Generally, inert gases are preferred barrier fluids according to the present invention, however, air is also a suitable barrier gas due to its widespread abundance and relatively low reactivity with the fuel cell, motor components, and the environment. Examples of barrier gases for use in accordance with the present embodiment include, for example, air (approximately 79% $N_2$, 21% $O_2$, and other trace diluents), nitrogen, helium, and mixtures thereof. The storage tank 204 is connected to the fluid handling device 202 via a connection passage 206. A reduction valve 208 is disposed in the connection passage 206 for preventing backflow of barrier gas and optionally for regulating the pressure of the barrier fluid as it enters the fluid handling device 202. The remaining aspects of the fuel cell system 200 are the same as depicted in FIG. 1.

Figure 7:
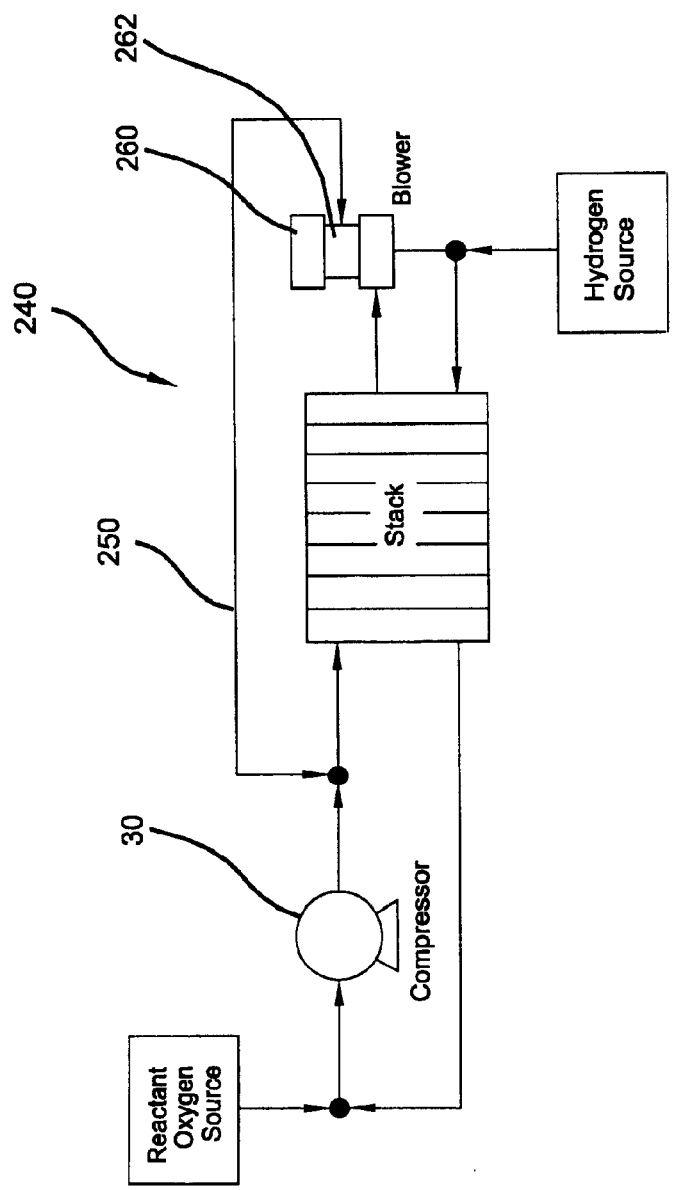
FIG. 7 is a schematic representation of an alternate embodiment of a fuel cell system according to the present invention where barrier fluid is delivered from a cathode circulation loop to a sealing system for a fluid handling device according to the present invention.

In another preferred embodiment of the present invention, shown in FIG. 7, a fuel cell system 240 is shown where compressed air that is used as reactant for the cathode inlet is diverted from the cathode compressor/blower 30 for use as the barrier fluid. A portion of the cathode inlet supply stream is diverted into a supply passage 250. The supply passage 250 connects to a fluid handling device 260 where the barrier gas is delivered to an interconnection compartment 262. The remaining components of the fuel cell system 240 are the same as those described in previous embodiments. Thus, the diverted portion of the cathode inlet stream provides a barrier gas having a pressure equal to or higher than process fluids (here for example, the anode recirculation fluid handling device 260). Thus, the present embodiment presents a simplified system, because duplicate gas conditioning systems are not required, and further there is no need for independent pressure instrumentation within the compartments, as the cathode pressure is maintained above the anode pressure for fuel cell operations.

Figure 8:
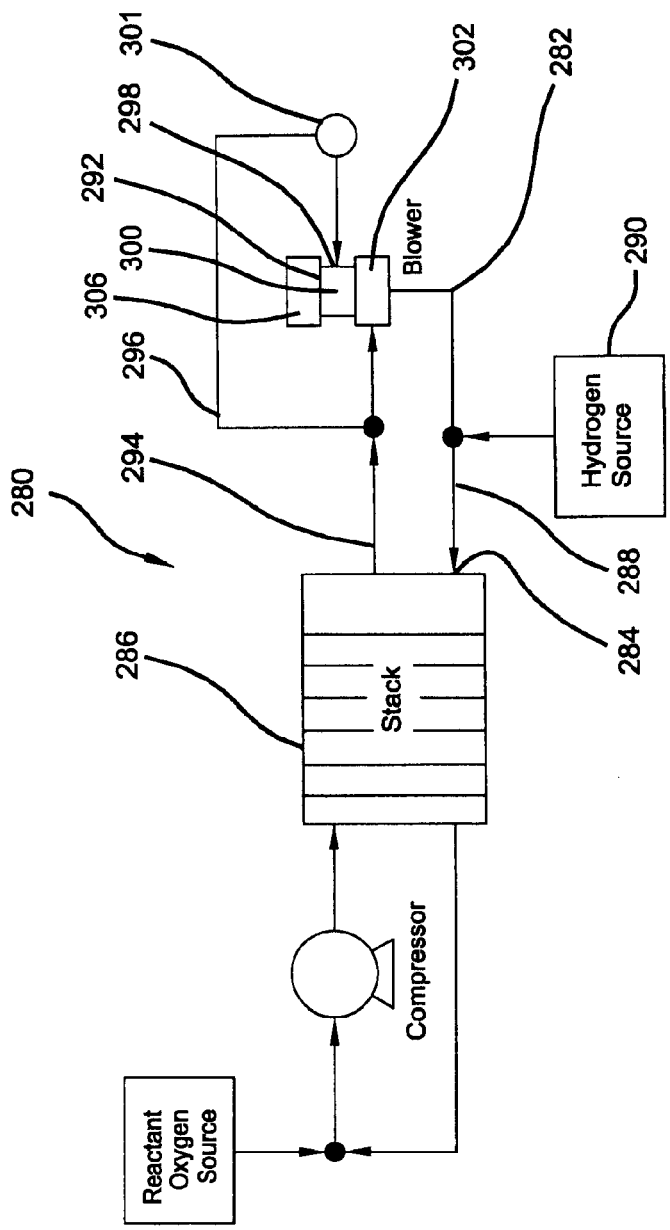
FIG. 8 is a schematic representation of another alternate embodiment of a fuel cell system according to the present invention where barrier fluid is delivered from an anode recirculation loop to a sealing system for a fluid handling device according to the present invention.

FIG. 8 shows an alternate preferred embodiment of a fuel cell system 280 according to the present invention where an anode recirculation loop 282 comprises an inlet 284 to a stack 286 where an inlet passage 288 receives hydrogen gas reactant from a hydrogen supply source 290 as well as recirculated anode process fluids from an anode recirculation fluid handling device 292. The anode fluid handling device 292 receives anode effluent from the stack 286 through an anode feed passage 294. A barrier fluid delivery passage 296 diverts a portion of the recirculated anode effluent stream to transport to an inlet 298 of an interconnection compartment 300 having a sealing assembly according to the present invention (not shown) in the fluid handling device 292. The sealing assembly provides a slight increase of pressure in the interconnection compartment 300 above the pressure of the barrier fluid delivered thereto. A reduction value 301 is disposed in the barrier fluid delivery passage 296. The present embodiment provides a slightly higher pressure in the interconnection compartment 300 as compared to a stage compartment 302. Thus, in addition to the sealing assembly, it prevents process fluids from flowing into the interconnection compartment 300 or to a drive compartment 306. It should be noted that anode effluent exiting the stack 286 has a relatively low hydrogen concentration, and the anode effluent is primarily comprised of nitrogen, water vapor, and other diluents, such that the quantity of hydrogen migrating to the drive compartment 306 is negligible. The operation of any of the above described fuel cell systems with barrier fluid delivery are preferably automated by controllers and responsive to operational parameter functions as recognized by one of skill in the art.

The present invention also provides methods of operating a fluid handling device in a fuel cell. An interconnection compartment is formed between a first seal and a second seal. The first seal is bounded by a process fluid compartment and a second seal bounded by a drive compartment. The interconnection compartment contains a shaft that extends from the process fluid compartment containing process fluids to the drive compartment, which is in fluid communication with ambient. The interconnection compartment further houses a ring for sealing that rotates with the shaft. A barrier fluid is supplied to the interconnection compartment, where the barrier fluid has a pressure greater than or equal to the process fluid compartment, thereby preventing migration of process fluids through the first seal to the interconnection compartment, the drive compartment, or both. In certain preferred embodiments, at least a portion of the barrier fluid is supplied from a fluid stream delivered to or from the fuel cell. The barrier fluid may comprise a portion of fluid streams delivered to or from the cathode or in the alternate, the anode. In alternate preferred embodiments, at least a portion of the barrier fluid is supplied from a fluid stream delivered from a barrier fluid storage vessel.

The present approach alleviates difficulties attendant to efforts to construct better process fluid isolation seals for fluid handling devices processing high pressure process streams. The present invention may also be contrasted to other methods of isolating process fluids from the other compartments and the surrounding environment by enclosure of the entire pump, including the drive and the process fluid compartments. The present invention is particularly useful to promote fluid isolation of highly pressurized process streams, by creating a lower differential pressure across at least a portion of the sealing assembly, thus preventing fluid migration. The present invention provides fluid handling devices and methods of isolating process fluids that prevent both migration of process fluids into the surrounding environment, while further protecting the drive compartment from any degradation or attack by the process fluids. Further, due to low physical contact, wear by friction is reduced, and the lifespan of sealing systems of the present invention are improved over prior art sealing assemblies. The present invention provides a highly effective isolation of high pressure process fluids, and can be incorporated into fuel cell systems with relative ease and low cost.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fluid handling device for a process fluid comprising: a process fluid compartment in contact with process fluids having a first pressure; a drive compartment having a second pressure and having a drive unit for moving the process fluids in said process fluid compartment, wherein said first pressure is greater than said second pressure; and a sealing assembly disposed between said process fluid compartment and said drive compartment, comprising a ring, a first seal, and a second seal, wherein said first seal and said second seal form an interconnection compartment through which said drive unit extends, wherein the ring is fixed to the drive unit inside the interconnection compartment on a first surface of the ring by a first collar and on a second surface of the ring by a second collar, wherein the first collar is sealingly fixed to the drive unit and extends between the drive unit and the first seal and the second collar is sealingly fixed to the drive unit and extends between the drive unit and the second seal; wherein said sealing assembly substantially prevents migration of said process fluids to said drive compartment.

2. The fluid handling device according to claim 1 wherein said interconnection compartment of said sealing assembly has a third pressure greater than said first pressure.

3. The fluid handling device according to claim 2, wherein a pressure difference between said third pressure and said first pressure is less than or equal to about 1.5 bar.

4. The fluid handling device according to claim 2, wherein a pressure difference between said third pressure and said first pressure is between about 0.1 to about 0.5 bar.

5. The fluid handling device according to claim 2, wherein said process fluid is delivered to or from a fuel cell.

6. The fluid handling device according to claim 2, wherein said interconnection compartment contains a pressurized barrier fluid.

7. The fluid handling device according to claim 6, wherein said pressurized barrier fluid comprises a portion of a fluid stream delivered to or from a fuel cell.

8. The fluid handling device according to claim 6, wherein said pressurized barrier fluid comprises a portion of a fluid stream delivered to or from a storage vessel.

9. The fluid handling device according to claim 1, wherein said first seal comprises a first seal head for facing the first surface of the ring and said second seal comprises a second seal head for facing the second surface on an opposite side of said first surface of the ring, wherein the fluid handling device is operable to form a gap between said first or said second surface of said ring and said first seal head and said second seal head, respectively, less than or equal to about 5 µm.

10. The fluid handling device according claim 9, wherein said first surface has at least one groove formed therein for enhancing barrier fluid flow speed between said ring and said first seal head.

11. A method of operating a fluid handling device in a fuel cell, the method comprising: forming an interconnection compartment between a first seal bounded by a process fluid compartment and a second seal bounded by a drive compartment, said interconnection compartment containing a shaft that extends from said process fluid compartment containing process fluids to said drive compartment wherein said interconnection compartment further houses a ring for sealing that rotates with said shaft wherein the ring is fixed to the shaft inside the interconnection compartment on a first surface of the ring by a first collar and on a second surface of the ring by a second collar, wherein the first collar is sealingly fixed to the shaft and extends between the shaft and the first seal and the second collar is sealingly fixed to the shaft and extends between the shaft and the second seal; and supplying a barrier fluid to said interconnection compartment, wherein said barrier fluid has a pressure greater than or equal to said process fluid compartment, thereby preventing migration of process fluids through said first seal to said interconnection compartment.

12. The method according to claim 11, wherein at least a portion of said barrier fluid is supplied from a fluid stream delivered to or from the fuel cell.

13. The method according to claim 11, wherein at least a portion of said barrier fluid is supplied from a fluid stream delivered to or from the cathode.

14. The method according to claim 11, wherein at least a portion of said barrier fluid is supplied from a fluid stream delivered to or from the anode.

15. The method according to claim 11, wherein at least a portion of said barrier fluid is supplied from a fluid stream delivered from a barrier fluid storage vessel.

16. The method according to claim 11, wherein the first seal is biased toward the first surface of the ring to open a gap between the first seal and the first surface while the fluid handling device is operating, and the second seal is biased toward the second surface of the ring to open a gap between the second seal and the second surface while the fluid handling device is operating.

* * * * *